United States Patent [19]

Balme et al.

[11] 4,299,946
[45] Nov. 10, 1981

[54] IMIDO COPOLYMERS FROM OLIGOIMIDE AND PHENOLIC COMPOUND

[75] Inventors: Maurice Balme, Sainte-Foy Les Lyon; Jean-Louis Locatelli, Vienne, both of France

[73] Assignee: Rhone-Poulenc Industries, Paris, France

[21] Appl. No.: 951,000

[22] Filed: Oct. 13, 1978

[30] Foreign Application Priority Data

Oct. 14, 1977 [FR] France ................................ 77 31672

[51] Int. Cl.$^3$ ............................................. C08G 73/10
[52] U.S. Cl. ................................. 528/128; 428/473.5; 521/180; 521/189; 525/397; 525/422; 528/125; 528/126; 528/167; 528/168; 528/169; 528/170; 528/172; 528/173; 528/322
[58] Field of Search ............... 528/125, 126, 128, 167, 528/168, 169, 170, 172, 173, 322

[56] References Cited

U.S. PATENT DOCUMENTS

| | | | |
|---|---|---|---|
| 4,038,251 | 7/1977 | Forgo et al. | 528/170 |
| 4,065,433 | 12/1977 | Muller et al. | 528/170 |
| 4,115,359 | 9/1978 | Darms et al. | 528/170 |
| 4,115,368 | 9/1978 | Roth et al. | 528/170 |

*Primary Examiner*—Harold D. Anderson
*Attorney, Agent, or Firm*—Burns, Doane, Swecker & Mathis

[57] ABSTRACT

Novel imido copolymers, useful for the production of a variety of shaped articles, e.g., by molding, are prepared by reacting an oligoimide with an aromatic compound bearing labile hydrogen atom(s) on the nucleus thereof, or by co-reacting such oligoimide and aromatic compound with a polyamine.

12 Claims, No Drawings

4,299,946

IMIDO COPOLYMERS FROM OLIGOIMIDE AND PHENOLIC COMPOUND

BACKGROUND OF THE INVENTION

1. Field of the Invention

The present invention relates to novel polymers derived from compounds bearing imide functions, to a process for the production of such polymers, and to the use thereof in the preparation of shaped articles.

2. Description of the Prior Art

It is known, from French Pat. No. 1,555,564, that certain thermosetting polymers can be prepared by reacting a bis-imide of an unsaturated dicarboxylic acid with a bis-primary diamine. When cured or thermoset by heat, these polymers afford heat-stable resins.

SUMMARY OF THE INVENTION

One of the primary objects of the present invention is to provide polymers comprising imide groups, which, when used for compression molding, do not exhibit the disadvantages of the previously known polymers, and especially do not require in their processing the use of too elaborate a technique or the use of equipment which is difficult to convert to an industrial scale.

According to the invention, novel polymers comprising imide groups have now been found which, since same can be processed by simple casting in the molten state, are capable of satisfying the aforenoted objective.

DETAILED DESCRIPTION OF THE INVENTION

More specifically, the present invention relates to novel polymers, characterized in that same are prepared by reacting:

(a) an oligoimide of the structural formula:

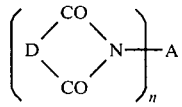

in which D represents a divalent radical which can be one of the radicals of the structural formulae:

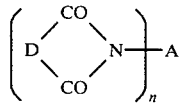

in which Y and Y', which are identical or different, represent H, $CH_3$, or Cl and m is equal to 0 or 1, the symbol A represents an organic radical of valency n, containing up to 50 carbon atoms, and n represents a number equal to at least 1.5 and at most 5; with (b) an aromatic compound bearing one or more labile hydrogen atoms on the nucleus thereof.

New improved resins according to the invention can also be obtained from:

(a) an oligoimide of the structural formula:

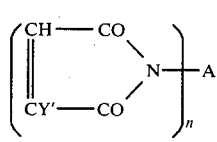

in which D, A and n are defined as above, (b) an aromatic compound bearing one or more labile hydrogen atoms on the nucleus thereof, and (c) a polyamine of the general formula $G(NH_2)_z$ in which G is an organic radical of valency z, and z is a number equal to at least 2.

Insofar as the aforenoted oligoimides are concerned, maleimides of the structural formula:

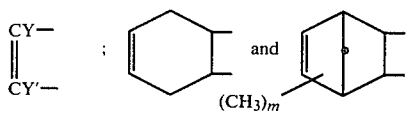

in which Y', A and n are as defined above, are the preferred.

In the above-mentioned formulae (I) and (II), A advantageously is an alkylene radical having less than 13 carbon atoms, a phenylene or cyclohexylene radical, or one of the radicals of the formulae:

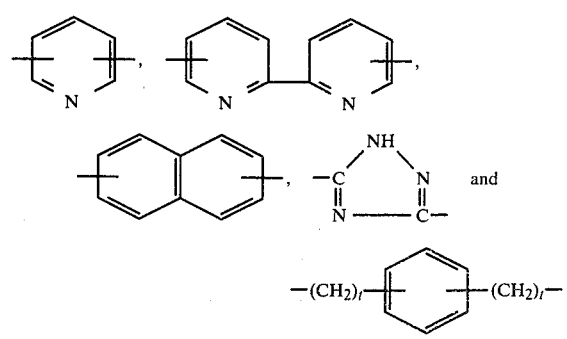

in which t represents an integer from 1 to 3; A can also represent a divalent radical having from 12 to 30 carbon atoms, which consists of phenylene or cyclohexylene radicals joined to one another by a single valence bond or by an inert hetero atom or group such as —O—, —S—, an alkylene group having from 1 to 3 carbon atoms, —CO—, —SO$_2$—, —NR$_1$—, —N=N—, —CONH—, —P(O)—R$_1$—, —CONH—X—NHCO—,

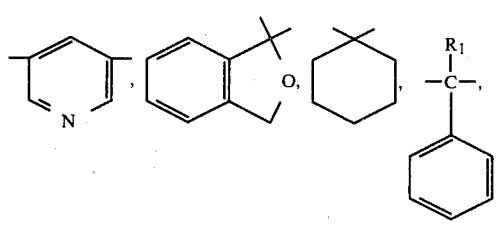

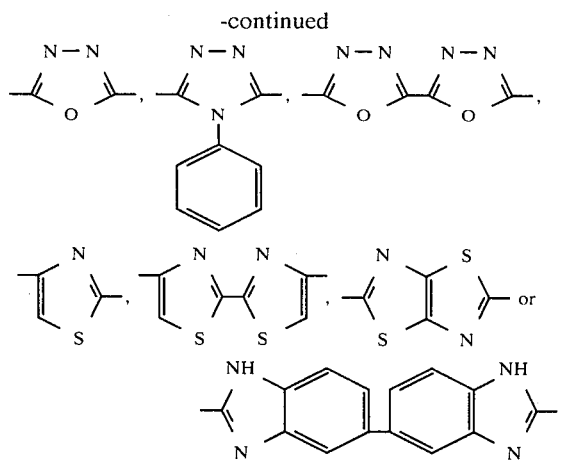

in which R₁ represents a hydrogen atom, an alkyl radical having from 1 to 4 carbon atoms, or a phenyl or cyclohexyl radical, and X represents an alkylene radical having less than 13 carbon atoms. In addition, the various phenylene or cyclohexylene radicals can be substituted by groups such as CH₃ and OCH₃ or by a chlorine atom.

The symbol A can also represent a radical which contains up to 50 carbon atoms and possesses from 3 to 5 free valencies, it being possible for the said radical to consist of a naphthalene, pyridine or triazine nucleus, a benzene nucleus which can be substituted by one to three methyl groups, or several benzene nuclei joined to one another by an inert hetero atom or group which can be one of those indicated above, or also

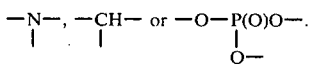

Finally, the symbol A can represent a linear or branched chain alkyl or alkenyl radical which can contain up to 18 carbon atoms, a cycloalkyl radical containing 5 or 6 carbon atoms in the ring, a mono- or bi-cyclic aryl radical or an alkylaryl or aralkyl radical, containing up to 18 carbon atoms, one of the radicals:

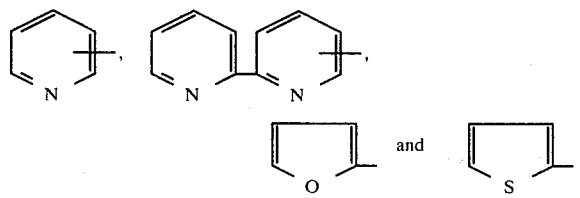

or a monovalent radical consisting of a phenyl radical and a phenylene radical joined to one another by a single valence bond or by an inert atom or group such as —O—, —S—, an alkylene radical having from 1 to 3 carbon atoms, —CO—, —SO₂—, —NR₁—, —N=N—, —CONH—, —COO— or —COOR₁, in which R₁ is as above defined. In addition, these various radicals can be substitute by atoms, radicals or groups, such as F, Cl, CH₃, OCH₃, OC₂H₅, OH, NO₂, —COOH, —NH—COCH₃, $$-N\begin{matrix}CO-CH_2\\ |\\ CO-CH_2\end{matrix}$$

and —OCOCH₃.

Consistent with the immediately foregoing, the maleimide component, which is preferred for carrying out the process according to the invention, can be a particular polymaleimide or a mixture containing maleimides of different functionalities. In the particular case where a mixture comprising a monomaleimide is used, the proportion of the latter in the mixture is preferably such that the number of maleimide groups carried by the monomaleimide does not represent more than 30% of the total number of maleimide functions employed in the reaction.

In particular, the maleimide of the formula (II) can be a bis-imide such as, for example: N,N′-ethylene-bis-maleimide; N,N′-hexamethylene-bis-maleimide; N,N′-metaphenylene-bis-maleimide; N,N′-para-phenylene-bis maleimide; N,N′-4,4′-biphenylene-bis-maleimide; N,N′-4,4′-diphenylmethane-bis-maleimide; N,N′-4,4′-(diphenyl ether)-bis-maleimide; N,N′-4,4′-(diphenyl sulfide)-bis-maleimide; N,N′-4,4′-diphenyl sulfone-bis-maleimide; N,N′-4,4′-dicyclohexylmethane-bis-maleimide; N,N′-α,α′-4,4′-dimethylenecyclohexane-bis-maleimide; N,N′-meta-xylylene-bis-maleimide; N,N′-para-xylylene-bis-maleimide; N,N′-4,4′-(1,1-diphenylcyclohexane)-bis-maleimide; N,N′-4,4′-diphenylmethane-bis-chloromaleimide; N,N′-4,4′-(1,1-diphenylpropane)-bis-maleimide; N,N′-4,4′-(1,1,1-triphenylethane)-bis-maleimide; N,N′-4,4′-triphenylmethane-bis-maleimide; N,N′-3,5-(1,2,4-triazole)-bis-maleimide; N,N′-dodecamethylene-bis-maleimide; N,N′-(2,2,4-trimethylhexamethylene)-bis-maleimide; N,N′-4,4′-diphenylmethane-bis-citraconimide; 1,2-bis-(2-maleimidoethoxy)-ethane; 1,3-bis-(3-maleimidopropoxy)-propane; N,N′-4,4′-benzophenone-bis-maleimide; N,N′-pyridine-2,6-diyl-bis-maleimide; N,N′-1,5-naphthylene-bis-maleimide; N,N′-1,4-cyclohexylene-bis-maleimide; N,N′-1,3-(5-methylphenylene)-bis-maleimide; and N,N′-1,3-(5-methoxyphenylene)-bis-maleimide.

These bis-amides can be prepared by the methods described in U.S. Pat. No. 3,018,290 and British Patent Specification No. 1,137,592.

The following are exemplary of the monomaleimides which can be used: N-phenylmaleimide; N-phenylmethylmaleimide; N-phenylchloromaleimide; N-(p-chlorophenyl)-maleimide; N-(p-methoxyphenyl)-maleimide; N-(p-methylphenyl)-maleimide; N-(p-nitrophenyl)-maleimide; N-(p-phenoxyphenyl)-maleimide; N-(p-phenylaminophenyl)-maleimide; N-(p-phenoxycarbonylphenyl)maleimide; 1-maleimido-4-acetoxysuccinimidobenzene; 4-maleimido-4′-acetoxysuccinimidodiphenylmethane; 4-maleimido-4′-acetoxysuccinimidodiphenyl ether; 4-maleimido-4′-acetamidodiphenyl ether; 2-maleimido-6-acetamidopyridine; 4-maleimido-4′-acetamidodiphenylmethane; and N-(p-phenylcarbonylphenyl)-maleimide.

These mono-imides can be prepared by the method described in U.S. Pat. No. 2,444,536 for the preparation of an N-arylmaleimide.

Further examples of the maleimide (II) according to the invention are the oligomers with imide functions having the structural formula:

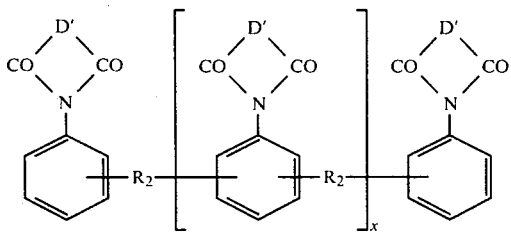

in which x represents a number ranging from about 0.1 to 2, the symbol $R_2$ represents a divalent hydrocarbon radical having from 1 to 8 carbon atoms, which is derived from an aldehyde or a ketone of the general formula

in which the oxygen atom is bonded to a carbon atom in the radical $R_2$, and the symbol $D'$ represents a divalent organic radical having from 2 to 24 carbon atoms, the valencies of which are carried by adjacent carbon atoms and which is derived from an internal anhydride of the general formula:

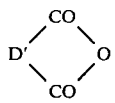

a proportion of at least about 60% of the radicals $D'$ representing a radical of the formula:

in which the symbol Y is as defined above, it being possible for the radicals $D'$ which may remain to represent, in particular, an alkylene, cycloalkylene or carbocyclic or heterocyclic aromatic radical. The preparation of these oligomers with imide groups is described in German Application No. 2,230,874.

In the case of the aromatic compound (b), the compound employed bears, on the basic nucleus thereof, one or more hydrogen atoms which are rendered labile by the presence, on the aromatic nucleus which carries them, of at least two electron-attracting substituents, of which one is always a hydroxyl group and the other (when there are two) or the others (when there are more than two) are selected from the group comprising: —OH, —NO₂, —ONO₂, —CN, —NO, —COOH, —COOR', —OR' (in which R' is an alkyl radical having from 1 to 4 carbon atoms), —Cl, —Br, —I and —F.

More particularly, the aromatic compound (b) is a mononuclear compound of the formula:

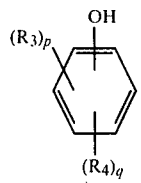

in which: the symbols $R_3$, which can be identical or different, represent electron-attracting substituents selected from the group comprising: —OH, —NO₂, —Cl, —Br and —I, the symbol $R_4$ represents a methyl group, p is an integer equal to 1 or 2, q is an integer equal to 0 or 1 and the sum (p+q) is equal to at most 2.

The aromatic compound (b) can also be a compound of the formula:

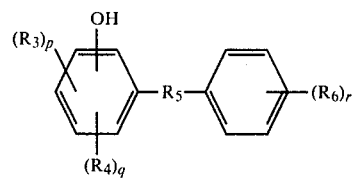

in which: $R_3$, $R_4$, p and q have the meanings given above, $R_5$ represents a group such as:

$$-CH_2-, -CH_2-CH_2-, -\underset{\underset{CH_3}{|}}{\overset{\overset{CH_3}{|}}{C}}-, -SO_2-, -SO-, -N=N-,$$

a sulphur or oxygen atom or a single valence bond, the symbols $R_6$, which can be identical or different, represent methyl groups and/or electron-attracting substituents selected from the group comprising: —OH, —NO₂, —Cl, —Br and —I, and r is an integer ranging from 0 to 3.

The aromatic compound (b) can also be a polynuclear compound of the formula:

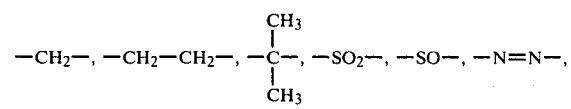

in which: the symbols $R_3$, $R_4$, $R_5$ (which can be identical or different), $R_6$, p, q and r have the meanings given above.

Exemplary of the aromatic compounds of the formulae (III) to (IV), there are mentioned: 1,2,3-trihydroxybenzene; 1,2,4-trihydroxybenzene, 1,3,5-trihydroxybenzene; 1,2-dihydroxybenzene; 1,2-dihydroxy-4-chlorobenzene; 1,2-dihydroxy-4-bromobenzene; 1,2-dihydroxy-3-methylbenzene; 1,3-dihydroxybenzene; 1,3-dihydroxy-5-chlorobenzene; 1,3-dihydroxy-6-bromobenzene; 1,3-dihydroxy-2-methylbenzene; 1-4-dihydroxybenzene; 1,4-dihydroxy-2-chlorobenzene; 1,4-dihydroxy-2-nitrobenzene; 2,4-dichlorophenol; 3,5-dichlorophenol; 3,5-dinitrophenol; 2-chloro-5-nitrophenol; 2-chlorophenol; 4-chlorophenol; 3-chlorophenol; 4-bromophenol; 4-iodophenol; 4-nitrophenol; 2,2'-dihydroxy-5,5'-dichlorodiphenylmethane; 2,5-dihydroxydiphenylmethane; 2,4,2',4'-tetrahydroxybiphenyl; 2,5,2',5'-tetrahydroxybiphenyl; 2,2'-dihydroxy-3,3'-dinitrobiphenyl; 2,2'-dihydroxy-5,5'-dinitrobiphenyl; 2,4-dihydroxy-2',4'-dinitroazobenzene; 2,4-dihydroxyazobenzene; 2,4-dihydroxy-4'-nitroazobenzene; 2-hydroxy-5-nitroazobenzene; 3-nitro-4-hydroxyazobenzene; 3-hydroxy-4,6-dinitrodiphenyl ether; 2,5-dihydroxydiphenyl-sulfone; 2,3-dihydroxydiphenylsulfone; 2,5,2',5'-tetrahydroxydiphenyl sulfide; and bis-(2',4'-dihydroxyazobenzene)methane.

As aromatic compounds (b), it is also possible to use a compound which contains in its structure, two or more than two ortho-fused, or alternatively ortho- and perifused, aromatic nuclei, and in which at least one aromatic nucleus bears at least two electron-attracting substituents, of which one is a hydroxyl group, whereas the other substituent or substituents are selected from the group comprising: —OH, —NO₂, —Cl, —Br and —I.

Examples which may be mentioned are: 1,2-dihydroxynaphthalene; 1,4-dihydroxynaphthalene; 2,3-dihydroxynaphthalene; 1-nitro-2-hydroxynaphthalene; 1,6-dinitro-2-hydroxynaphthalene; 1-chloro-3-hydroxynaphthalene; 1-bromo-2-hydroxynaphthalene; 1,2-dihydroxyanthracene; 1,2,9-tri-hydroxyanthracene; 1,4,9-trihydroxyanthracene; and 1,2,10-trihydroxyanthracene.

Finally, those derivatives of 9,10-anthraquinone in which at least one aromatic nucleus is substituted by at least two electron-attracting groups are also suitable, one of these substituents being a hydroxyl group and the other substituent or substituents being selected from the group comprising: —OH, —NO₂, —Cl, —Br and —I.

Examples which will be mentioned are: 1,2-dihydroxy-9,10-anthraquinone; 1,4-dihydroxy-9,10-anthraquinone; 1,3-dihydroxy-9,10-anthraquinone; and 2,3-dihydroxy-9,10-anthraquinone.

The aromatic compounds (b) which are very particularly suitable within the scope of the present invention are selected from the group comprising: 1,4-dihydroxybenzene; 1,3-dihydroxybenzene; 1,2-dihydroxybenzene; 1,2,3-trihydroxybenzene; 2,4-dihydroxyazobenzene; 1,4-dihydroxy-9,10-anthraquinone; bis-(2',4'-dihydroxyazobenzene)-methane; 4-nitrophenol; 4-chlorophenol; and 4-bromophenol.

In the case of the polyamine (c) of the general formula (G(NH₂)$_z$, a bis-primary diamine of the general formula: H₂N—Q—NH₂ (VI), in which the symbol Q is one of the divalent radicals represented by the symbol A, is preferred.

By way of illustration, polyamines (c) which are suitable within the scope of the invention are, in particular: 4,4'-diaminodicyclohexylmethane; 1,4-diaminocyclohexane; 2,6-diaminopyridine; meta-phenylenediamine; para-phenylenediamine; 4,4'-diaminodiphenylmethane; 2,2-bis-(4-aminophenyl)-propane; benzidine; 4,4'-diamino-diphenyl ether; 4,4'-diaminodiphenyl sulfone; bis-(4-aminophenyl)-methylphosphine oxide; bis-(4-aminophenyl)-phenylphosphine oxide; N,N'-(4-aminophenyl)methylamine; 1,5-diaminonaphthalene; meta-xylylenediamine; para-xylylenediamine; 1,1-bis-(para-aminophenyl)-phthalene; hexamethylenediamine; 6,6'-diamino-2,2'-bipyridyl; 4,4'-diaminobenzophenone; 4,4'-diaminoazobenzene; bis-(4-aminophenyl)-phenylmethane; 1,1-bis-(4-aminophenyl)-cyclohexane; 1,1-bis-(4-amino-3-methylphenyl)-cyclohexane; 2,5-bis-(m-aminophenyl)-1,3,4-oxadiazole; 2,5-bis-(p-aminophenyl)-1,3,4-oxadiazole; 2,5-bis-(m-aminophenyl)-thiazolo[4,5-d]thiazole; 5,5'-di-(m-aminophenyl)-2,2'-bis-(1,3,4-oxadiazolyl); 4,4'-bis-(p-aminophenyl)-2,2'-bithiazole; m-bis-[4-(p-aminophenyl)-thiazol-2-yl]-benzene; 2,2'-bis-(m-aminophenyl)-5,5'-bibenzimidazole; 4,4'-diaminobenzanilide; 4-aminophenyl-4-aminobenzoate; N,N'-bis-(4-aminobenzoyl)-p-phenylene-diamine; 3,5-bis-(m-aminophenyl)-4-phenyl-1,2,4-triazole; 4,4'-[N,N'-bis-(p-aminobenzoyl)-diamino]-diphenylmethane; p-bis-(4-aminophenoxycarbonyl)-benzene; p-bis-(4-aminophenoxy)-benzene; 3,5-diamino-1,2,4-triazole; 1,1-bis-(4-aminophenyl)-1-phenylethane; 3,5-bis-(4-aminophenyl)-pyridine; 1,2,4-triaminobenzene; 1,3,5-triaminobenzene; 2,4,6-triaminotoluene; 2,4,6-triamino-1,3,5-trimethylbenzene; 1,3,7-triaminonaphthalene; 2,4,4'-triaminobiphenyl; 2,4,6-triaminopyridine; 2,4,4'-triaminodiphenyl ether; 2,4,4'-triaminodiphenylmethane; 2,4,4'-triaminodiphenylsulfone; 2,4,4'-triaminobenzophenone; 2,4,4'-triamino-3-methyldiphenylmethane; N,N,N-tris-(4-aminophenyl)-amine; tris-(4-aminophenyl)-methane; 4,4',4"-triaminotriphenyl orthophosphate; tris-(4-aminophenyl)-phosphine oxide; 3,5,4'-triaminobenzanilide; melamine; 3,5,3',5'-tetraaminobenzophenone; 1,2,4,5-tetraaminobenzene; 2,3,6,7-tetraaminonaphthalene; 3,3'-diaminobenzidine; 3,3',4,4'-tetraaminodiphenyl ether; 3,3',4,4'-tetraaminodiphenylmethane; 3,3',4,4'-tetraaminodiphenylsulfone; 3,5-bis-(3,4-diaminophenyl)-pyridine; and the oligomers of the average formula:

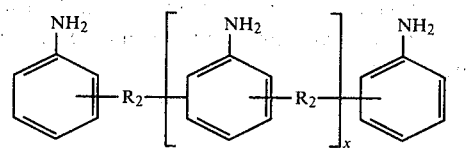

in which R₂ and x are as defined above. These oligomers with amine groups can be obtained in accordance with known processes, such as those described in French Pat. Nos. 1,430,977, 1,481,935 and 1,533,696.

For preparation of the polymers according to the invention, it must be understood that it is possible to employ a mixture of oligoimides (a) and also a mixture of aromatic compounds (b). Likewise, it is self-evident that the term polyamine can also denote mixtures of polyamines of the same functionality or, alternatively, mixtures of polyamines, at least two of which possess different functionalities. One or more bis-primary diamines are typically employed, optionally in association with one or more polyamines which are of higher functionality and can represent, by weight, up to 50% of the weight of the diamines employed.

If the polymers according to the invention are prepared from an oligoimide (a) and an aromatic compound having labile hydrogen atoms on the nucleus (b) (variant 1), the amounts of reactants are selected such that the ratio of the number of molecules of aromatic compound to the number of carbon-carbon double bonds in the oligoimide is between 0.01 to 1.1; the preferred amount corresponds to a ratio of between 0.05 and 1.1.

If the polymers according to the invention are prepared from an oligoimide (a), an aromatic compound having labile hydrogen atoms on the nucleus (b) and a polyamine (c) (variant 2), the amounts of reactant used are such that the ratio of the total number of molecules of the compound having labile hydrogens (b) and of the polyamine (c), on the one hand, to the number of double bonds in the oligoimide (a), on the other hand, is between 0.01 and 1.1; the preferred ratio is between 0.05 and 1.1. In the case of variant 2, the molar ratio of the aromatic compounds having labile hydrogens (b), on the one hand, to the polyamine (c), on the other hand, is between 0.02 and 50 and preferably between 0.05 and 20.

The reaction temperature can vary within fairly wide limits, depending on the nature and the number of the reactants present, but, as a general rule, it is between 50° C. and 300° C.

The polymers according to the invention can be prepared in bulk by heating the mixture comprising, in variant 1: an oligoimide (a) and an aromatic compound (b), and, in variant 2: an oligoimide (a), an aromatic compound (b) and a polyamine (c), at least until a homogeneous liquid is obtained. In the following text, this mixture will be denoted by the expression "reactant mixture". Before heating the reactant mixture, it is advantageous to homogenize same beforehand.

The polymers according to the invention can also be prepared by heating the reactant mixture in an organic diluent which is liquid in at least part of the range 50°–300° C. Among such diluents, there are mentioned, in particular, aromatic hydrocarbons such as xylenes and toluene, halogenohydrocarbons such as chlorobenzenes, ethers such as dioxane, tetrahydrofuran and dibutyl ether, dimethylformamide, dimethylsulfoxide and N-methylpyrrolidone. The solutions or suspensions of the polymers can be used, as obtained, for numerous purposes; the polymers can also be isolated, for example by filtration, optionally after precipitation using an organic diluent which is miscible with the solvent employed. In this context, a hydrocarbon having a boiling point which does not appreciably exceed 120° C. can advantageously be utilized.

However, these polymers can also be in the form of prepolymers (P) possessing a softening point at a temperature below 250° C. These prepolymers can be obtained in bulk by heating the reactant mixture until a homogeneous or pasty product is obtained, at a temperature which is generally between 50° and 200° C. The prepolymers can also be prepared in suspension or in solution in a diluent which is liquid in at least part of the range 50°–200° C.

It must be noted that, according to a preferred embodiment of the invention, it is possible, in the case of variant 2, to form a prepolymer (PP) from the oligoimide (a) and the aromatic compound (b), which prepolymer is then combined with the polyamine (c). It is also possible to prepare a prepolymer (PP) beforehand, by heating the mixture of the oligoimide (a) and the polyamine (c) and then combining it with the aromatic compound (b) in order to obtain the prepolymer (P).

The prepolymers (P) can be used in the form of a liquid mass, simple hot casting being sufficient to shape the mass and produce molded articles. After cooling and grinding, it is also possible to use them in the form of powders which are remarkably suitable for compression-molding operations, optionally in the presence of fillers in the form of powders, spheres, granules, fibers or flakes. In the form of suspensions or solutions, the prepolymers (P) can be used to produce coatings and pre-impregnated intermediate articles, the reinforcement of which can consist of fibrous materials based on aluminium silicate or oxide, or zirconium silicate or oxide, carbon, graphite, boron, asbestos or glass. These prepolymers (P) can also be used to produce cellular materials after the incorporation of a blowing agent such as, for example, azodicarbonamide.

In a second stage, the prepolymers (P) can be cured by heating up to temperatures on the order of 350° C.; a complementary shaping operation can be carried out during curing, optionally in vacuo or under a pressure greater than atmospheric pressure, it also being possible for these operations to be consecutive. Curing can be carried out in the presence of a radical polymerization initiator, such as lauryl peroxide or azo-bis-isobutyronitrile, or of an anionic polymerization catalyst such as diazobicyclooctane.

The polymers produced according to the invention are of value in those industrial fields which require materials possessing good mechanical and electrical properties, as well as a high degree of chemical inertness at temperatures of 200° C. to 300° C. By way of example, they are suitable for the manufacture of plate or tubular insulators for electrical transformers and for the manufacture of printed circuits, self-lubricating pinions, rings and stops.

In order to further illustrate the present invention and the advantages thereof, the following specific examples are given, it being understood that same are intended only as illustrative and in nowise limitative.

EXAMPLE 1

10.75 g (0.03 mol) of N,N'-4,4'-diphenylmethane-bis-maleimide and 5.35 g (0.025 mol) of 2,4-dihydroxyazobenzene were intimately mixed in a cutter-grinder. The homogeneous mixture thus obtained was placed in an aluminum dish and same was then placed in an oven heated to 140° C.

Samples were taken after various residence times at 140° C. and the double bonds in the residual bis-maleimide and the diazo groups in the residual 2,4-dihydroxyazobenzene were determined by conventional methods.

The softening points of the various samples taken were also determined.

The results were as follows:

TABLE I

| Residence time at 140° C. | 0 | 15 minutes | 30 minutes | 1 hour | 2 hours |
|---|---|---|---|---|---|
| Gram equivalents of double bonds in the residual bis-maleimide | 0.0595 | 0.0525 | 0.0500 | 0.0439 | 0.0400 |
| Mols of residual azo derivative | 0.0237 | 0.0206 | 0.0156 | 0.0127 | 0.0073 |
| Softening point (in °C.) | 131 | 60 | 70 | 83 | 95 |

It was determined that, overall, approximately 1 double bond in the bis-maleimide disappeared per molecule of 2,4-dihydroxyazobenzene.

EXAMPLE 2

22.4 g (0.0625 mol) of N,N'-4,4'-diphenylmethane-bis-maleimide and 11.82 g (0.027 mol) of bis-(2',4'-dihydroxyazobenzene)-methane were intimately mixed in a cutter-grinder. The mixture was placed in an aluminum dish and same was then placed in an oven at 180° C. for 50 minutes. The product obtained was finely ground; it possessed a softening point of 165° C.

25 g of this ground product were placed in a cylindrical mold having a diameter of 75 mm and a depth of 25 mm. Such assembly was placed between the platens of a press preheated to 250° C.; a pressure of 200 bars was applied for one hour. The article obtained was withdrawn from the mold and was then baked for 68 hours at 250° C. A smooth, black and homogeneous disc of attractive appearance was obtained, which displayed the following mechanical properties, measured in accordance with ASTM Standard Specification D 79063:

TABLE II

| PRO-PERTIES | INITIAL | | After 500 hours at 250° C. | |
| --- | --- | --- | --- | --- |
| | Measured at 25° C. | Measured at 250° C. | Measured at 25° C. | Measured at 250° C. |
| Flexural strength (kg/mm$^2$) | 10.7 | 4.7 | 10.8 | 2.7 |
| Bending modulus (kg/mm$^2$) | 285 | 135 | 280 | 145 |

EXAMPLE 3

An intimate admixture, produced from 31.5 g (0.088 mol) of N,N'-4,4'-diphenylmethane-bis-maleimide and 7.6 g (0.069 mol) of 1,3-dihydroxybenzene, was placed in an aluminum dish and then into an oven at 280° C. for 2 hours, 15 minutes.

The product recovered after this treatment was ground; it possessed a softening point of 161° C.

The results of a study of this product by spectroscopy (infra-red and nuclear magnetic resonance) make it possible to assign the following structure thereto:

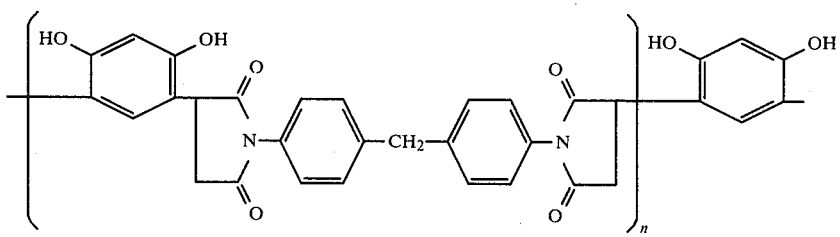

The powder obtained was shaped by compression-molding as described in Example 2.

Baking was carried out at 250° C. for 48 hours. The article obtained possessed a flexural strength of 10.6 kg/mm$^2$ at 25° C. and 6.1 kg/mm$^2$ at 250° C. (ASTM Standard Specification D 79063).

EXAMPLE 4

26 g (0.07 mol) of N,N'-4,4'-diphenylmethane-bismaleimide, 16 g (0.14 mol) of 1,4-dihydroxybenzene and 23 cm$^3$ of ortho-dichlorobenzene were introduced into a reactor equipped with a stirrer, a thermometer and a bulb condenser. The mixture was stirred, the entire mass was heated to 180° C. and the solvent was maintained under reflux for 5 hours. Precipitation was then carried out by adding the solution to ethyl ether; a yellow solid product was thus recovered and was filtered off, washed and dried.

The softening point of this powder was 84° C.; it was raised to 150° C. by a treatment consisting of maintaining the powder at 180° C. for 10 hours.

After grinding, the powder was processed by compression-molding as described in Example 2.

After having been baked at 250° C. for 48 hours, the shaped article obtained possessed a flexural strength of 9.5 kg/mm$^2$, measured at 25° C.

EXAMPLES 5 to 7

The reaction described in Example 4 was carried out, replacing the 1,4-dihydroxybenzene by varying amounts of 1,3-dihydroxybenzene. The table below indicates the respective weights of N,N'-4,4'-diphenylmethane-bis-maleimide and of 1,3-dihydroxybenzene employed in each experiment.

The powder obtained in each experiment was brought to a softening point of 160° C. by placing it in an oven heated to 180° C. for 1 hour.

After shaping by compression-molding, as described in Example 2, and baking at 250° C. for 48 hours, the flexural strength of the molded articles was measured at 25° C. and 250° C. (ASTM Standard Specification D 79063).

TABLE III

| EXAMPLES | Weight of bis-maleimide employed (in g) | Weight of 1,3-dihydroxybenzene employed (in g) | Initial flexural strength (kg/mm$^2$) | |
| --- | --- | --- | --- | --- |
| | | | at 25° C. | at 250° C. |
| 5 | 73.3 (0.2 mol) | 27.2 (0.25 mol) | 12.0 | 6.7 |
| 6 | 79.0 (0.22 mol) | 19.0 (0.17 mol) | 10.0 | 5.2 |
| 7 | 90.3 (0.25 mol) | 12.7 (0.11 mol) | 8.7 | 3.7 |

EXAMPLE 8

The operation described in Example 4 was repeated, using 4.48 g (0.012 mol) of N,N'-4,4'-diphenylmethane-bismaleimide, 6.0 g (0.031 mol) of 1,4-dihydroxyanthraquinone and 25 cm$^3$ of ortho-dichlorobenzene.

The product isolated, which had a softening point of 149° C. was processed by compression-molding as described in Example 2.

A strong, homogeneous, molded article was obtained.

EXAMPLE 9

70.0 g (0.19 mol) of N,N'-4,4'-diphenylmethane-bismaleimide and 15.6 g (0.081 mol) of 1,4-dihydroxy-9,10-anthraquinone were introduced into a cylindrical reactor equipped with a stirrer, a thermometer and a condenser. The assembly was immersed, under stirring, in a thermostatically controlled bath heated to 200° C. After a residence time of 10 minutes, a very fluid red liquid was obtained, which was degassed under a slightly reduced pressure and cast into a parallelepipedal mold preheated to 200° C.

The mass was maintained at 200° C. for 24 hours and the article obtained was then withdrawn from the mold; it was redbrown and homogeneous.

EXAMPLE 10

1 g of 4,4'-diaminodiphenylmethane was added to 25 g of the reaction product obtained in Example 4.

The mixture was homogenized by grinding and shaped by compression-molding as described in Example 2.

A homogeneous article of attractive appearance was obtained.

EXAMPLE 11

51.25 g (0.14 mol) of N,N'-4,4'-diphenylmethane-bis-maleimide and 19.28 g (0.15 mol) of 4-chlorophenol were introduced into a cylindrical reactor such as that used in Example 10. The mixture was heated to a temperature of 110° C. over the course of 30 minutes, under stirring, during which time homogenization was effected.

A very fluid, clear solution was obtained, which was degassed by creating a slightly reduced pressure (residual pressure 100 mm Hg); it was then cast into a parallelpipedal mold preheated to 150° C.

The mass was maintained at 150° C. for 12 hours. A cross-linked rigid article was obtained, which was baked at 200° C. for 24 hours.

EXAMPLE 12

Example 11 was repeated by replacing the 4-chlorophenol with 20.28 g (0.014 mol) of 4-nitrophenol.

After shaping, a homogeneous, rigid and strong plate was obtained.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims.

What is claimed is:

1. A thermosetting imido polymer produced by reacting a mixture consisting of:
(a) an oligoimide of the structural formula:

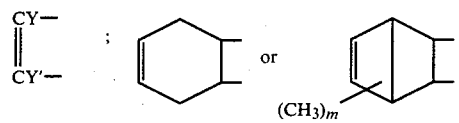

in which D represents a divalent radical which is one of the radicals of the structural formulae:

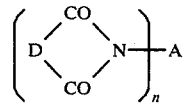

in which Y and Y', which are identical or different, represent H, CH$_3$, or Cl and m is equal to 0 or 1, the symbol A represents an organic radical of valency n, containing up to 50 carbon atoms, and n represents a number equal to at least 1.5 and at most 5; with (b) an aromatic compound selected from the group consisting of mononuclear and polynuclear aromatic compounds bearing on at least one aromatic nucleus thereof one or more labile hydrogen atoms which are rendered labile by the presence on said aromatic nucleus containing said labile hydrogen atoms of at least two electron-attracting substituents, of which one of said electron-attracting substituents comprises a hydroxyl group, and the other electron-attracting substituents are selected from the group consisting of: —OH—, —NO$_2$, —ONO$_2$, —CN, —NO, —COOH, —COOR', OR', in which R' is an alkyl radical having from 1 to 4 carbon atoms, —Cl, —Br, —I and —F.

2. A thermosetting imido polymer as defined by claim 1, wherein the oligoimide (a) is a maleimide of the formula:

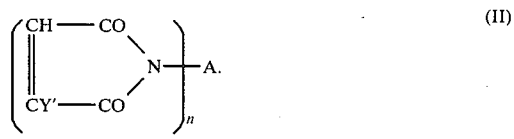

3. A thermosetting imido polymer as defined by claim 1 or 2, wherein the aromatic compound (b) is a compound of the formula:

in which: the symbols R$_3$, which are identical or different, represent electron-attracting substituents selected from the group consisting of: —OH, —NO$_2$, —Cl, —Br and —I, the symbol R$_4$ represents a methyl group, p is an integer equal to 1 or 2, q is an integer equal to 0 or 1 and the sum (p+q) is equal to at most 2.

4. A thermosetting imido polymer as defined by claim 1 or 2, wherein the aromatic compound (b) is a compound structurally comprising two or more than two ortho-fused, or ortho- and peri-fused aromatic nuclei, and in which at least one aromatic nucleus bears at least two electron-attracting substituents, of which one is a hydroxyl group, whereas the other electron-attracting substituent or substituents are selected from the group consisting of: —OH, —NO$_2$, —Cl, —Br and —I.

5. A thermosetting imido polymer as defined by claim 1 or 2, wherein the aromatic compound (b) is a 9,10-anthraquinone in which at least one aromatic nucleus is substituted by at least two electron-attracting groups, one of which substituents being a hydroxyl group and the other substituent or substituents being selected from the group consisting of: —OH, —NO$_2$, —Cl, —Br and —I.

6. A thermosetting imido polymer as defined by claim 1 or 2, wherein the aromatic compound (b) is selected from the group consisting of 1,4-dihydroxybenzene, 1,3-dihydroxybenzene, 1,2-dihydroxybenzene, 1,2,3-trihydroxybenzene, 2,4-dihydroxyazobenzene, 1,4-dihydroxy-9,10-anthraquinone, bis-(2',4'-dihydroxyazobenzene)-methane, 4-nitrophenol, 4-chlorophenol and 4-bromophenol.

7. A process for the preparation of the thermosetting imido polymer as defined by claim 1, comprising heating the mixture consisting of the oligoimide (a) and the aromatic compound having labile hydrogen atoms on the nucleus (b) to a temperature of between 50° and 300° C.

8. The process as defined by claim 7, wherein the amounts of reactants are selected such that the ratio of the number of molecules of the aromatic compound (b) to the number of carbon-carbon double bonds in the oligoimide (a) is between 0.01 and 1.1.

9. The process as defined by claim 7, comprising heating the mixture consisting of the oligoimide (a) and the aromatic compound having labile hydrogen atoms on the nucleus (b) to between 50° and 200° C. to form a thermosetting prepolymer (P) in a first stage and thence curing the prepolymer (P) to form a thermoset polymer by heating to a temperature of between 150° and 300° C.

10. A thermosetting imido polymer as defined by claims 1 or 2, wherein the aromatic compound (b) is a compound of the formula:

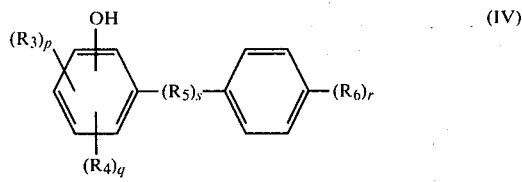

wherein the symbols $R_3$, which are identical or different, represent electron-attracting substituents selected from the group consisting of —OH, —NO$_2$, —Cl, —Br and —I; the symbol $R_4$ represents a methyl group; p is an integer equal to 1 or 2; q is an integer equal to 0 or 1, and the sum (p+q) is equal to at most 2; $R_5$ is selected from the group consisting of —CH$_2$—, —CH$_2$—CH$_2$—,

—SO$_2$—, —SO—, —N=N—, —S—, or —O—; the substituents $R_6$, which are identical or different, are selected from the group consisting of methyl groups and electron-attracting groups selected from the group consisting of —OH, —NO$_2$, —Cl, —Br and —I; r is an integer ranging from 0 to 3; and s is an integer equal to 0 or 1.

11. A thermosetting imido polymer as defined by claims 1 or 2, wherein the aromatic compound (b) is a compound of the formula:

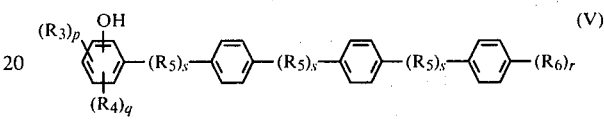

wherein the symbols $R_3$, which are identical or different, represent electron-attracting substituents selected from the group consisting of —OH, —NO$_2$, —Cl, —Br, and —I; the symbol $R_4$ represents a methyl group; p is an integer equal to 1 or 2; q is an integer equal to 0 or 1, and the sum (p+q) is equal to at most 2; $R_5$ is selected from the group consisting of —CH$_2$—, —CH$_2$—CH$_2$—,

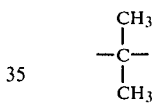

—SO$_2$—, —SO—, —N=N—, —S—, or —O—; the substituents $R_6$, which are identical or different, are selected from the group consisting of methyl groups and electron-attracting groups selected from the group consisting of —OH, —NO$_2$—, —Cl, —Br, and —I; r is an integer ranging from 0 to 3; and s is an integer equal to 0 or 1.

12. A imido polymer as defined by claims 1, 2, 3, 4, 6, 10 or 11, in thermoset form.

* * * * *